US010782224B2

(12) United States Patent
Nitta

(10) Patent No.: US 10,782,224 B2
(45) Date of Patent: Sep. 22, 2020

(54) SPECTRUM ANALYSIS APPARATUS, FINE PARTICLE MEASUREMENT APPARATUS, AND METHOD AND PROGRAM FOR SPECTRUM ANALYSIS OR SPECTRUM CHART DISPLAY

(75) Inventor: Nao Nitta, Tokyo (JP)

(73) Assignee: Sony Corporation, Tokyo (JP)

( * ) Notice: Subject to any disclaimer, the term of this patent is extended or adjusted under 35 U.S.C. 154(b) by 787 days.

(21) Appl. No.: 14/342,587

(22) PCT Filed: Sep. 12, 2012

(86) PCT No.: PCT/JP2012/005780
§ 371 (c)(1),
(2), (4) Date: Mar. 4, 2014

(87) PCT Pub. No.: WO2013/038660
PCT Pub. Date: Mar. 21, 2013

(65) Prior Publication Data
US 2014/0222381 A1 Aug. 7, 2014

(30) Foreign Application Priority Data
Sep. 13, 2011 (JP) ................ 2011-199901

(51) Int. Cl.
*G01N 33/48* (2006.01)
*G01N 33/50* (2006.01)
(Continued)

(52) U.S. Cl.
CPC ........ *G01N 15/1429* (2013.01); *G01J 3/0264* (2013.01); *G01J 3/28* (2013.01);
(Continued)

(58) Field of Classification Search
None
See application file for complete search history.

(56) References Cited

U.S. PATENT DOCUMENTS 4,475,166 A * 10/1984 Cope ..................... G06F 17/10
708/442
5,123,731 A * 6/1992 Yoshinaga ......... G01N 15/0205
250/461.2
(Continued)

FOREIGN PATENT DOCUMENTS

JP 2002-505742 2/2002
JP 2003-083894 3/2003
(Continued)

OTHER PUBLICATIONS

Walker J. Colour Rendering of Spectra, 2003, 8 pages. Obtained online from <<http://www.fourmilab.ch/documents/secrend/>> on Apr. 3, 2017.*
(Continued)

*Primary Examiner* — Russell S Negin
(74) *Attorney, Agent, or Firm* — K&L Gates LLP

(57) ABSTRACT

Provided is a spectrum analysis apparatus including a processing unit configured to generate analysis data using an analysis function in which a linear function and a logarithmic function are included as function elements and an intensity value is set as a variable from measurement data including the intensity value of light acquired by detecting the light from a measurement target object using a plurality of light-receiving elements having different detection wavelength bands.

33 Claims, 13 Drawing Sheets

(51) Int. Cl.
*G01N 15/14* (2006.01)
*G01J 3/02* (2006.01)
*G01J 3/28* (2006.01)
*G01N 21/25* (2006.01)
*G01N 15/10* (2006.01)

(52) U.S. Cl.
CPC ........ *G01J 3/2803* (2013.01); *G01N 15/1434* (2013.01); *G01N 15/1459* (2013.01); *G01N 21/255* (2013.01); *G01N 2015/1006* (2013.01)

(56) References Cited

U.S. PATENT DOCUMENTS

| | | | |
|---|---|---|---|
| 6,515,289 | B1 | 2/2003 | Kask |
| 7,676,330 | B1* | 3/2010 | Mazzagatti ....... G06F 17/30327 702/23 |
| 2003/0167156 | A1* | 9/2003 | Alba ................... G06F 17/5009 703/2 |
| 2004/0119974 | A1 | 6/2004 | Bishop et al. |
| 2005/0086017 | A1 | 4/2005 | Wang |
| 2005/0179904 | A1 | 8/2005 | Larsen et al. |
| 2006/0015291 | A1 | 1/2006 | Parks et al. |
| 2006/0215908 | A1 | 9/2006 | Kamon et al. |
| 2009/0018897 | A1* | 1/2009 | Breiter ............... G06Q 30/0203 705/7.32 |
| 2010/0023274 | A1 | 1/2010 | Lu et al. |
| 2010/0241357 | A1* | 9/2010 | Chan ........................ G01J 3/44 702/19 |
| 2010/0285594 | A1 | 11/2010 | Purvis |

FOREIGN PATENT DOCUMENTS

| | | |
|---|---|---|
| JP | 2011-232259 | 11/2011 |
| JP | 2012-18108 | 1/2012 |
| WO | 2006086579 | 8/2006 |
| WO | 2012/073824 | 6/2012 |

OTHER PUBLICATIONS

Han et al. Quantum-dot-tagged microbeads for multiplexed optical coding of biomolecules. Nature Biotechnology, vol. 19, pp. 631-635. (Year: 2001).*
Mattoussi et al. Electroluminescence from heterostructures of poly(pheylene vinylene) and inorganic CdSe nanocrystals. Journal of Applied Physics, vol. 83, pp. 7965-7974. (Year: 1998).*
Laerum et al. Clinical application of flow cytometry: a review. Cytometry, vol. 2, pp. 1-13. (Year: 1981).*
Parks et al., "A New 'Logical' Display Method Avoids Deceptive Effects of Logarithmic Scaling for Low Signals and Compensated Data", Cytometry Part A, 2006, pp. 541-551.
Chinese Office Action dated Jul. 3, 2015, for corresponding Chinese Appln. No. 201280043375.5 (18 pages).
Gregori et al., "Hyperspectral Cytometry at the Single-Cell Level Using a 32-Channel Photodetector", Cytometry Part A, 2011, pp. 1-10.
Extended European Search Report dated Mar. 26, 2015, for corresponding European Appln. No. 12831121.4.
Chinese Office Action dated Jul. 11, 2018 in corresponding Chinese Application No. 2017106843283.
Extended European Search Report dated Feb. 7, 2019 for App. No. 18188674.8 (10 pages).
Chinese Office Action and Search Report dated Apr. 22, 2019, for corresponding Chinese Appln. No. 2017106843283 (16 pages).
Office Action issued in related European Patent Application No. 18188674.8 dated Apr. 7, 2020. (8 pages).
French, J.F. et al., "Identification of a specific receptor for interleukin-1 in vascular smooth muscle cells: regulation by interleukin-1 and interleukin-6", European Journal of Pharmacology, Elsevier Science, NL, vol. 233, No. 1, Mar. 16, 1993, pp. 109-112.

* cited by examiner

[Fig. 1]
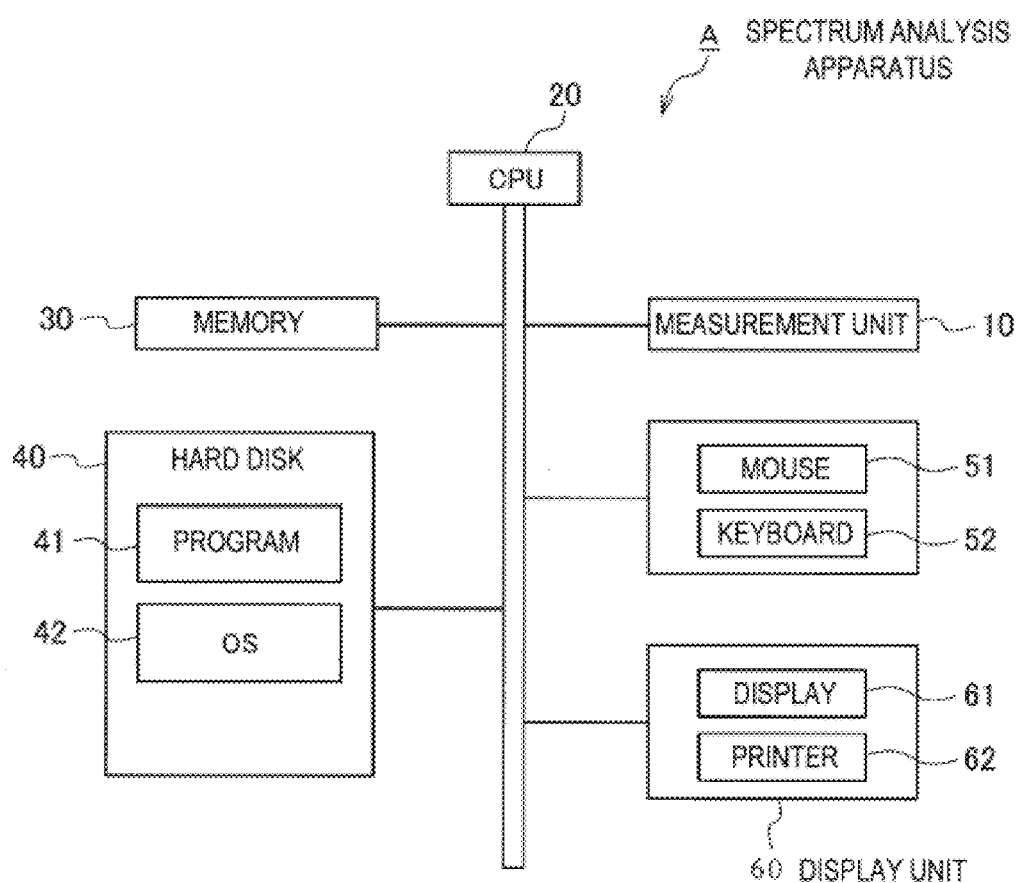

[Fig. 2]
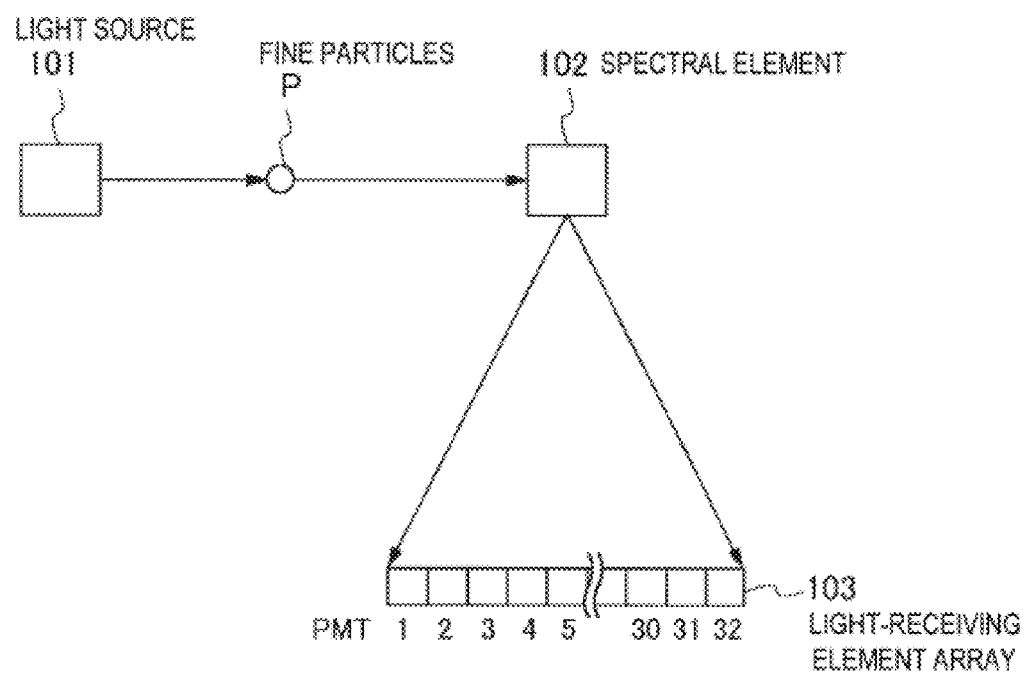

[Fig. 3]
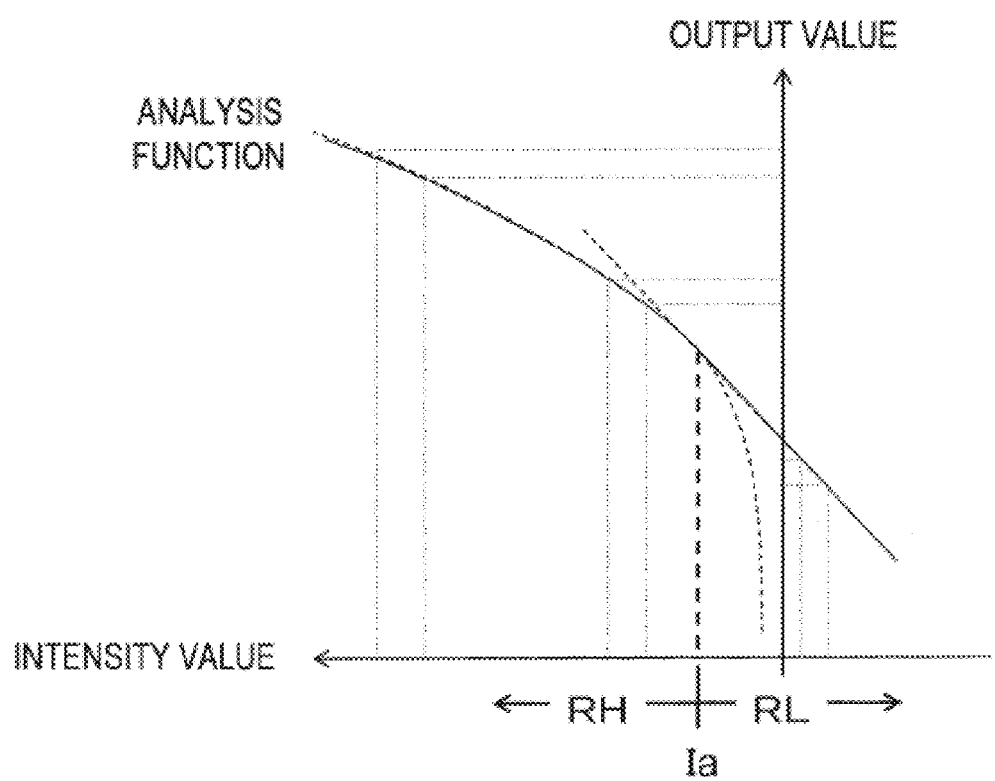

[Fig. 4]
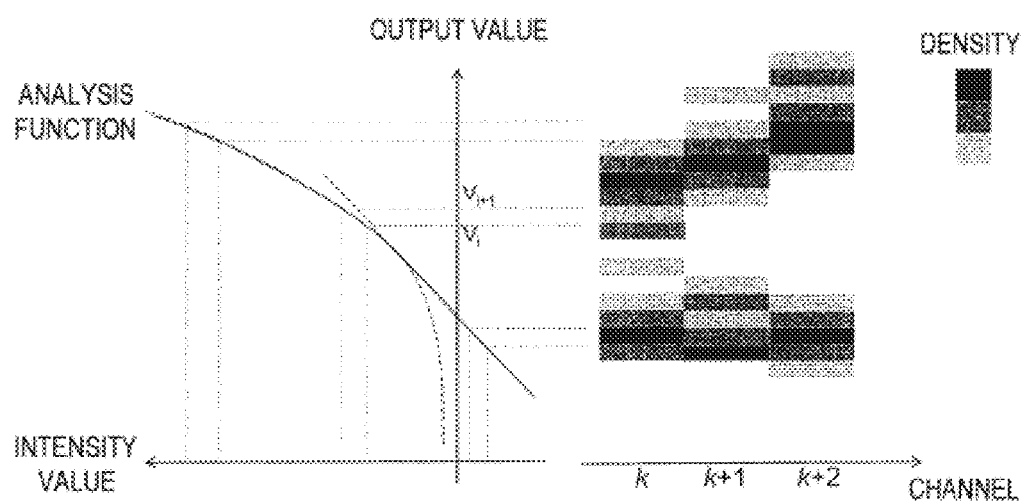

[Fig. 5]
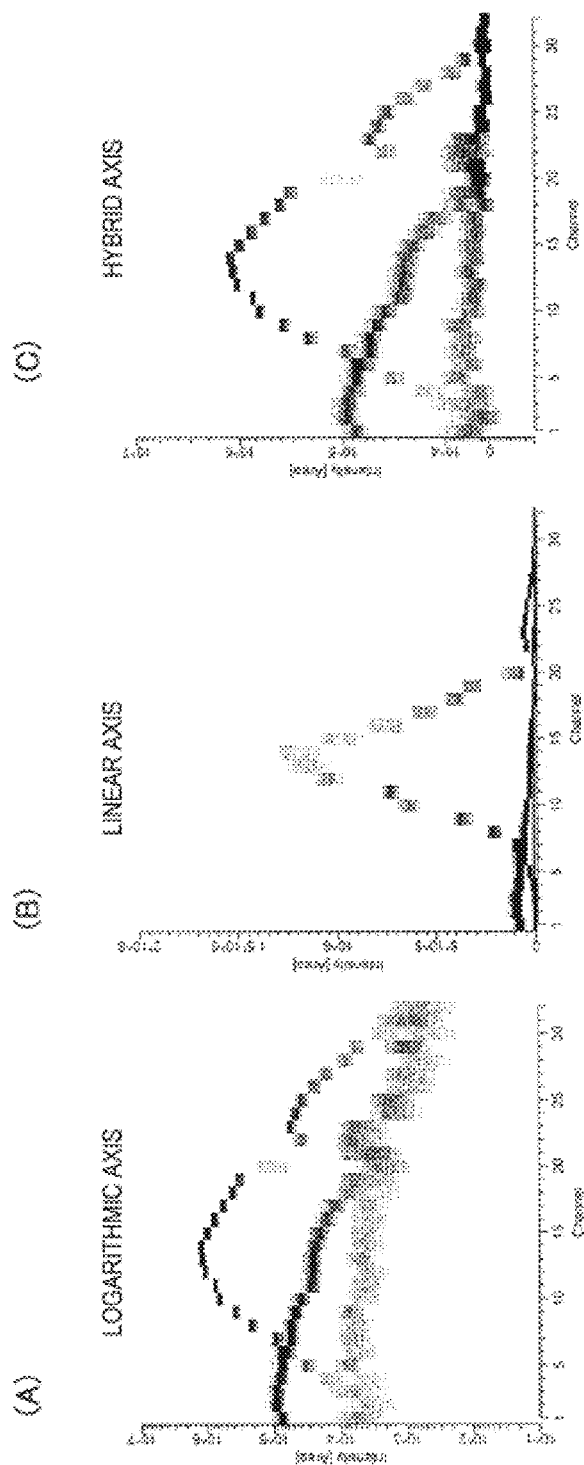

[Fig. 6]
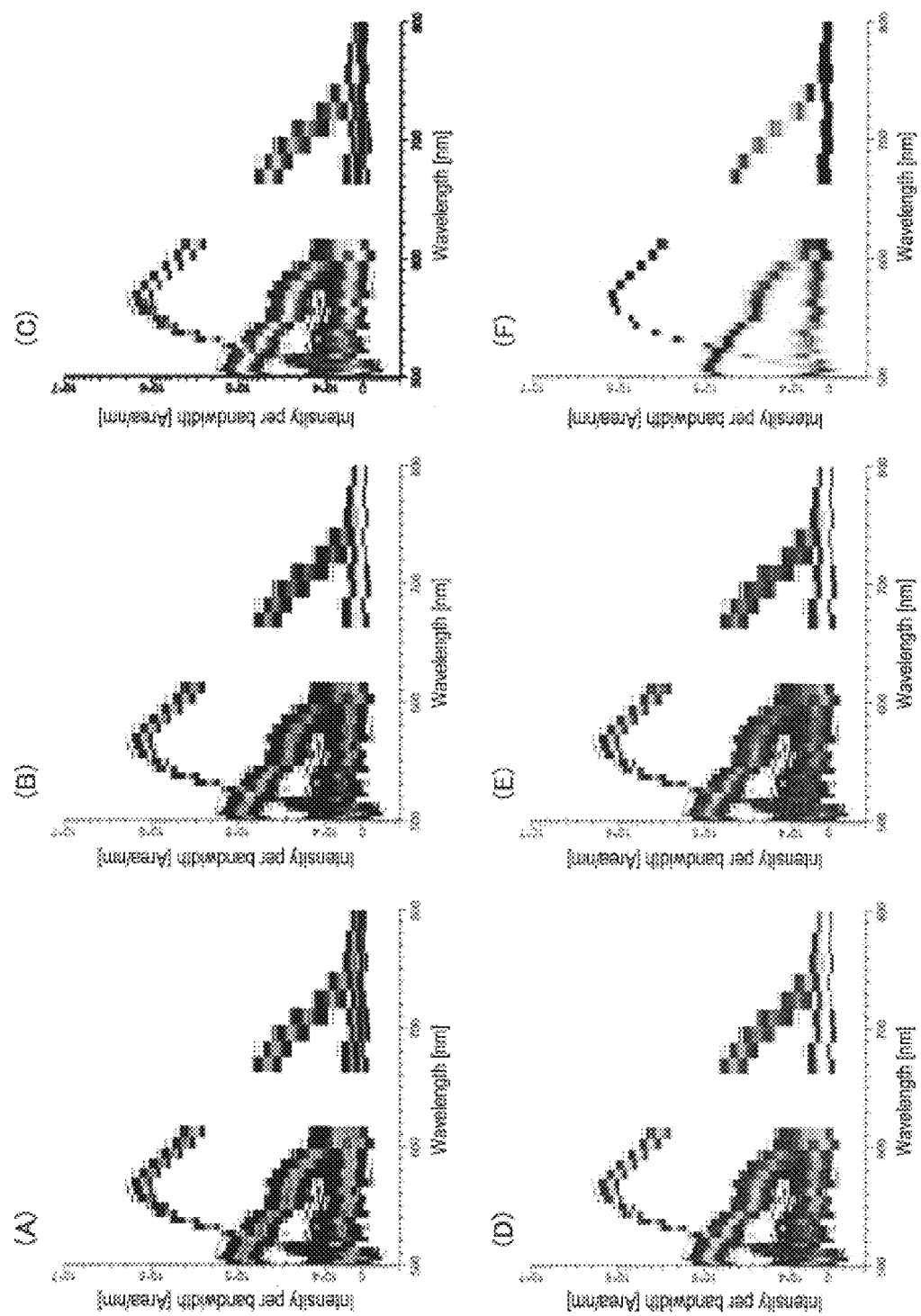

[Fig. 7]
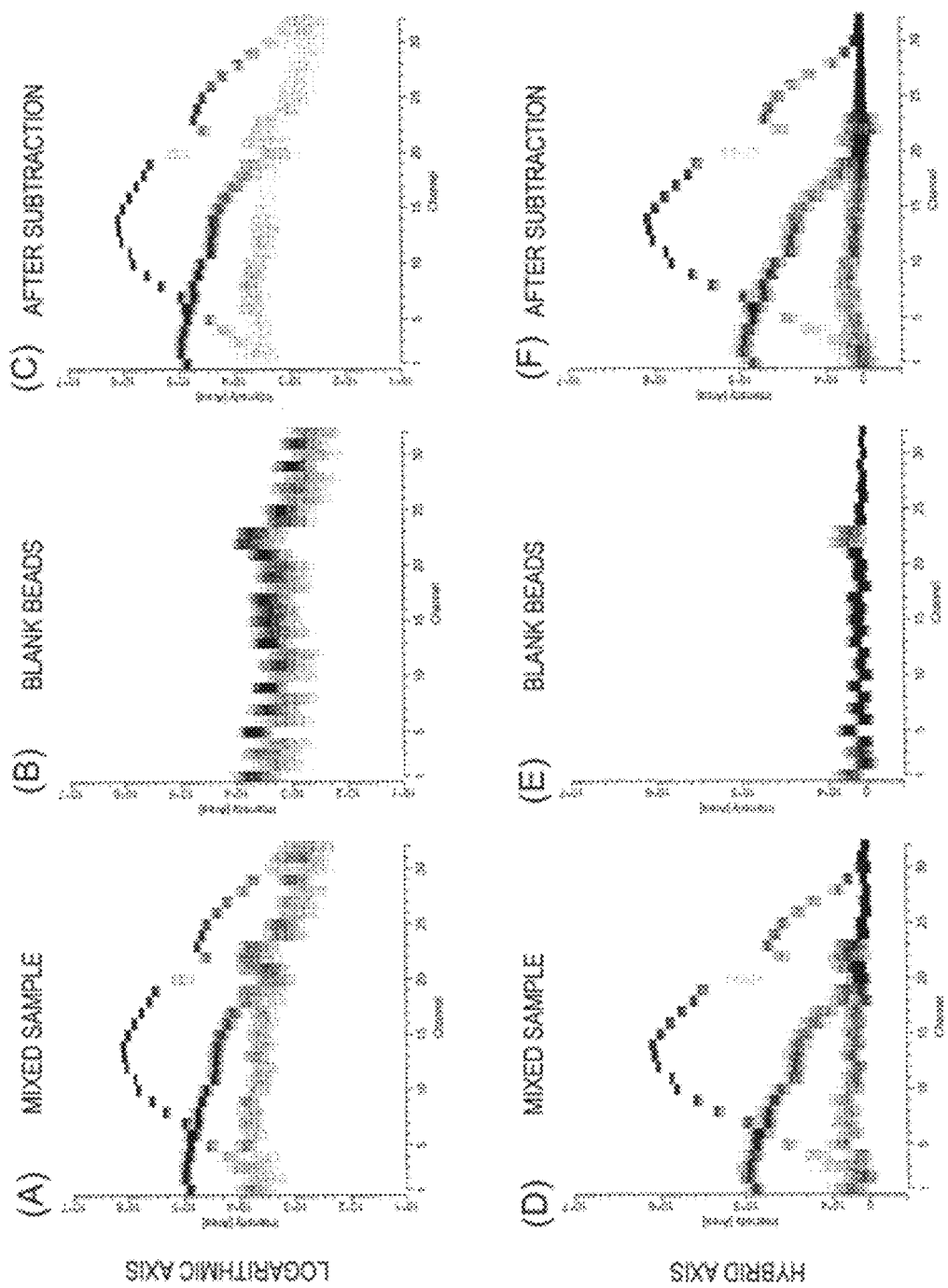

[Fig. 8]
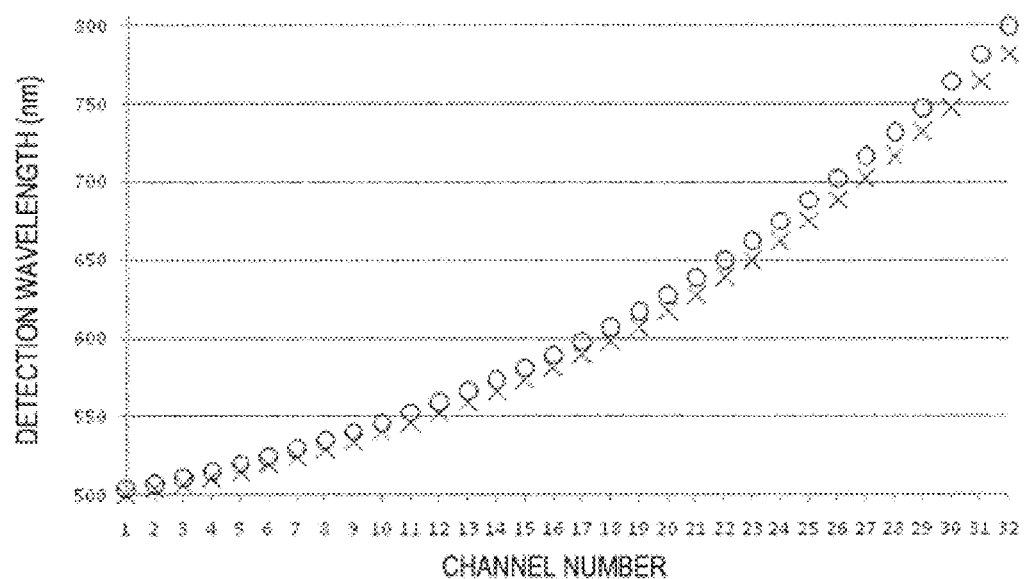
[Fig. 9]
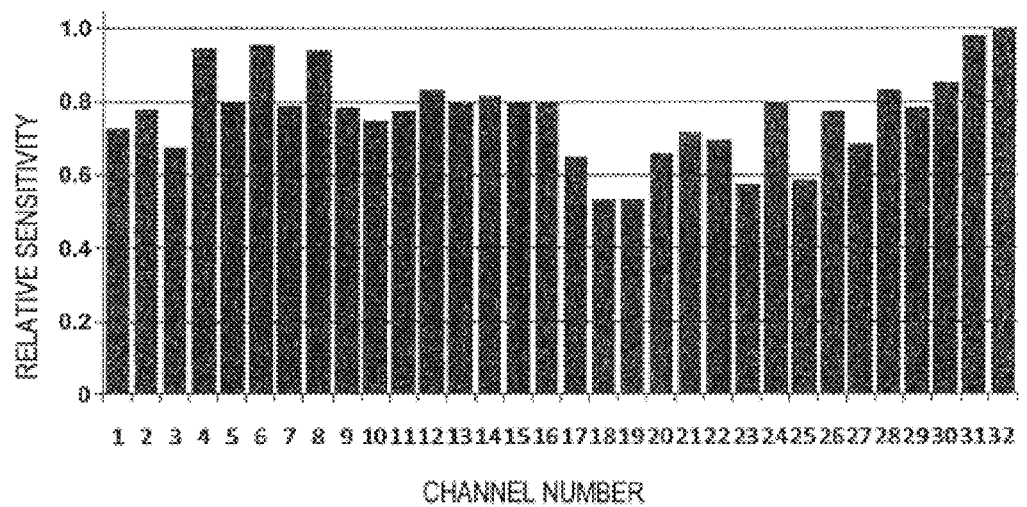

[Fig. 10]
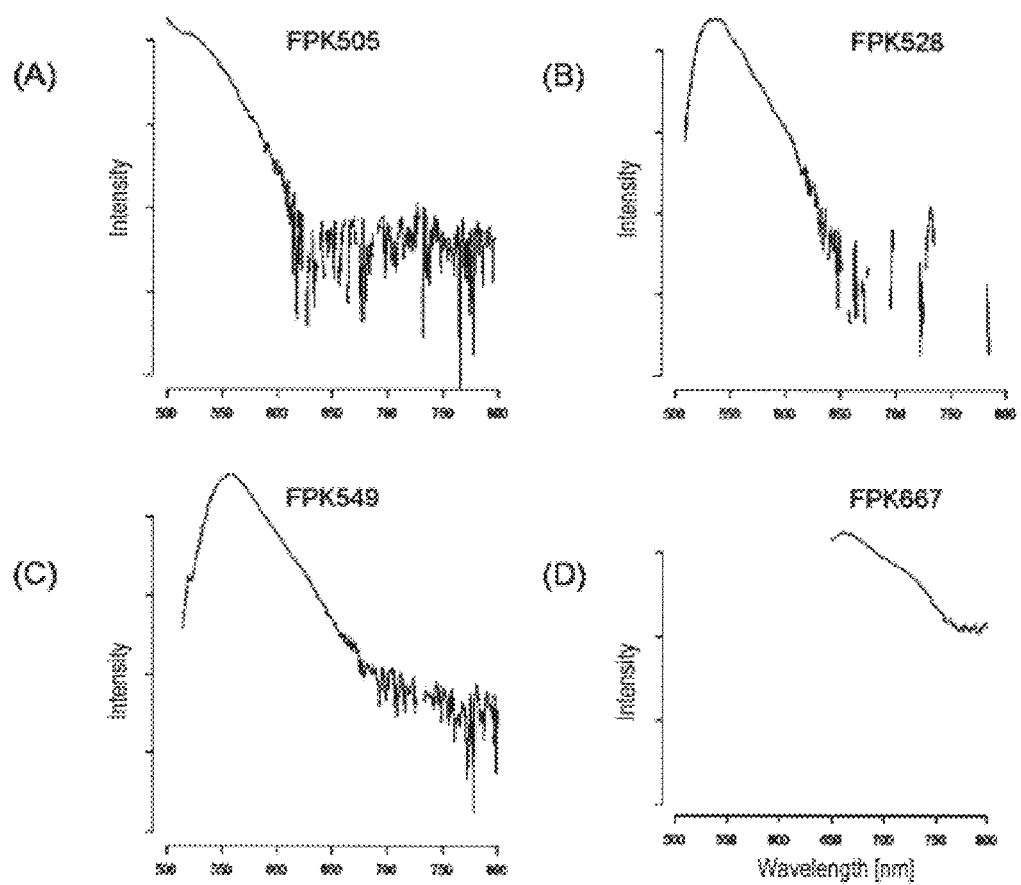

[Fig. 11]
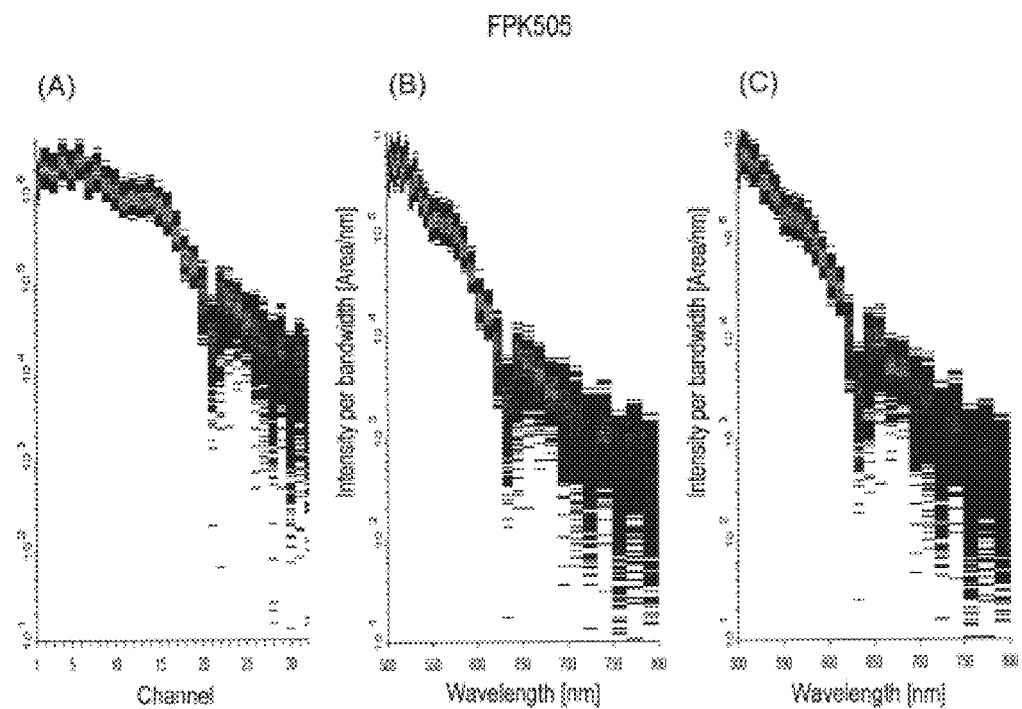
[Fig. 12]
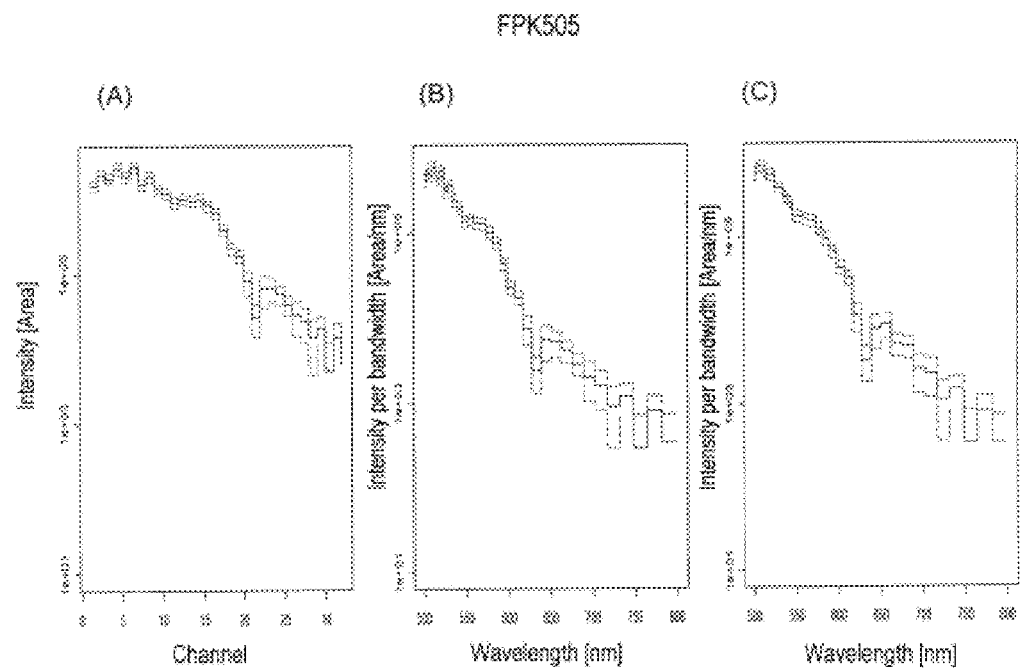

[Fig. 13]
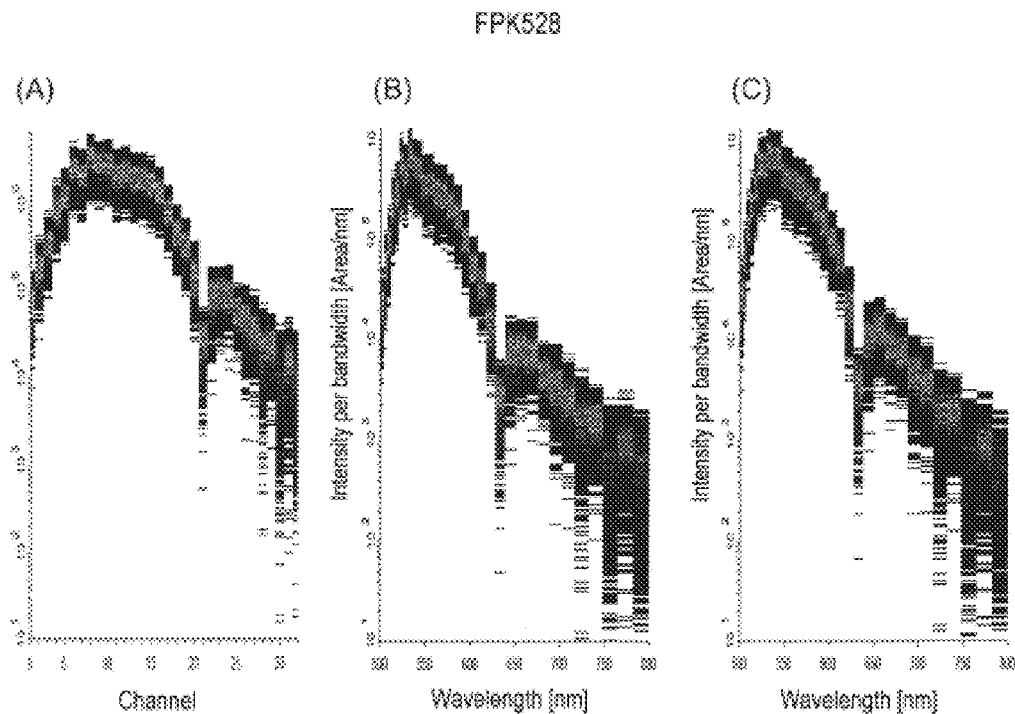
[Fig. 14]
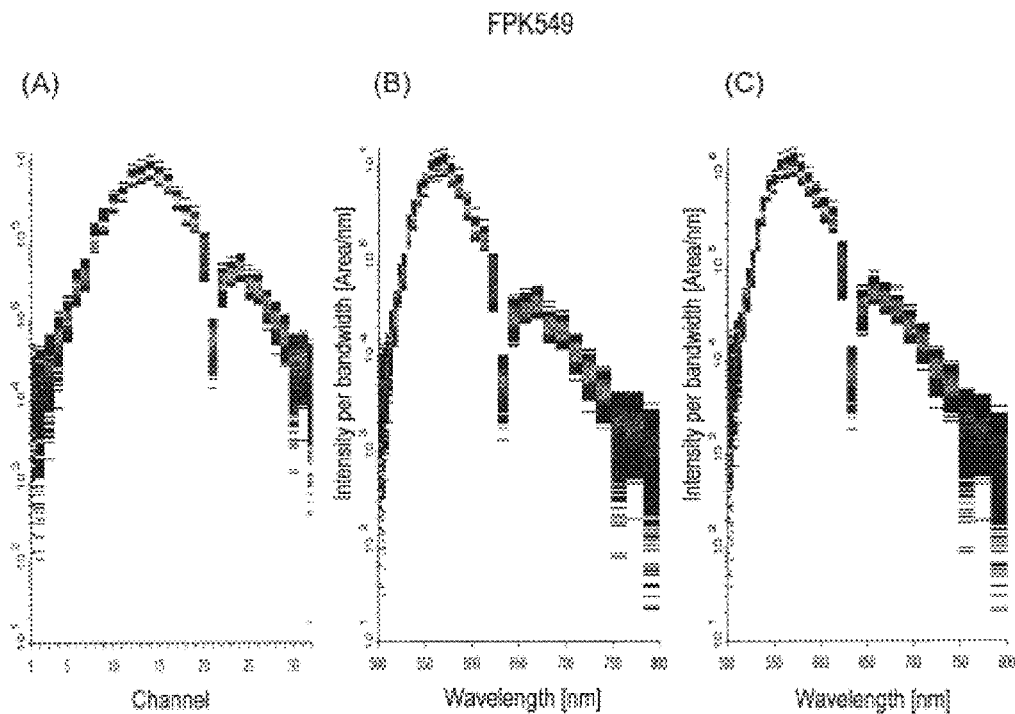

[Fig. 15]
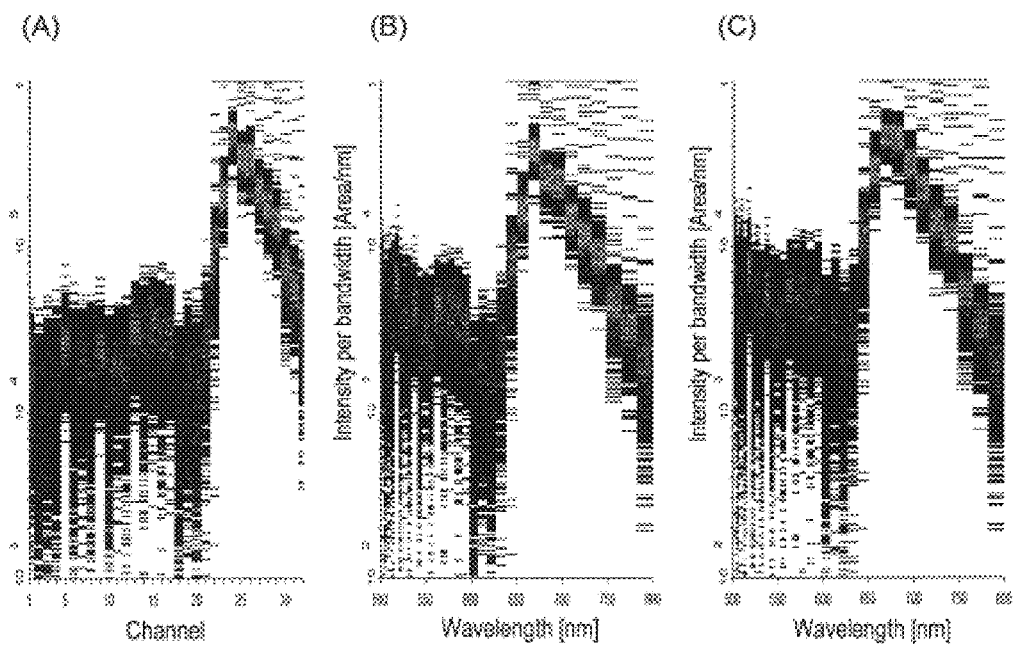

[Fig. 16]
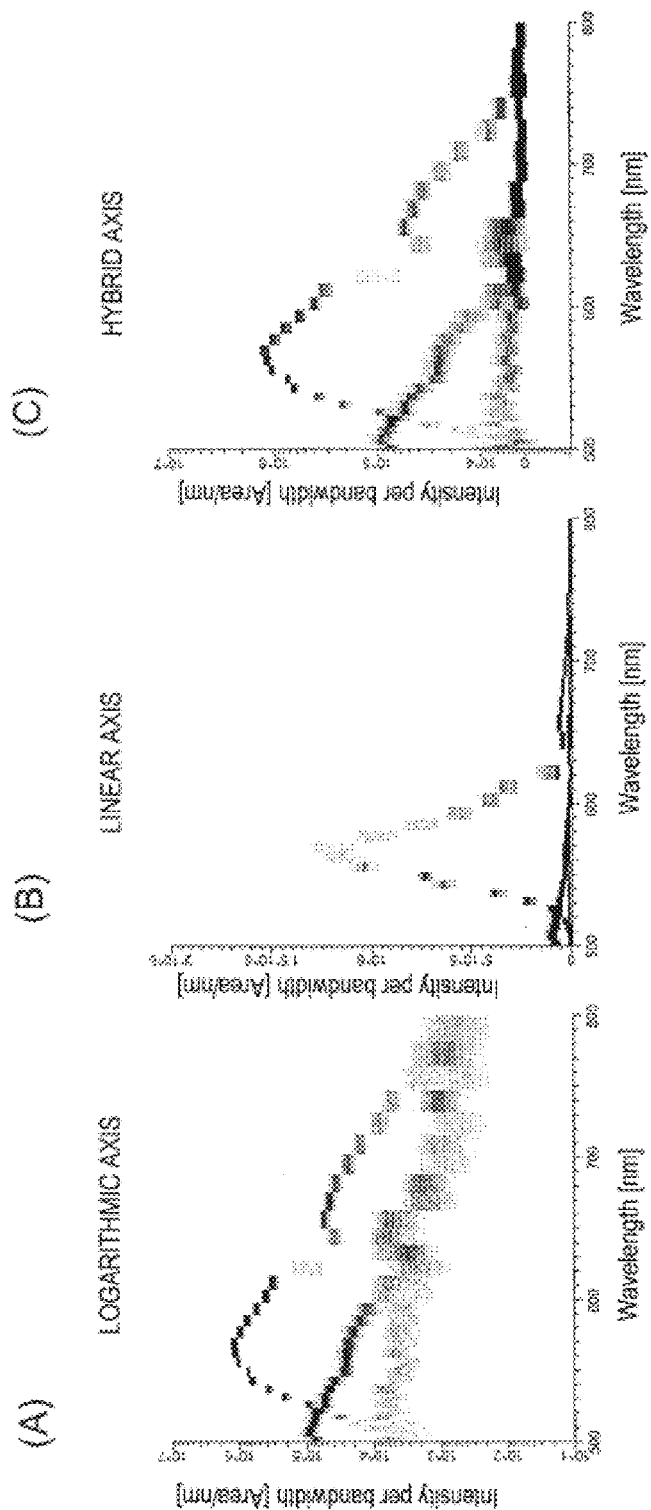

SPECTRUM ANALYSIS APPARATUS, FINE PARTICLE MEASUREMENT APPARATUS, AND METHOD AND PROGRAM FOR SPECTRUM ANALYSIS OR SPECTRUM CHART DISPLAY

CROSS REFERENCES TO RELATED APPLICATIONS

The present application is a national stage of International Application No. PCT/JP2012/005780 filed on Sep. 12, 2012 and claims priority to Japanese Patent Application No. 2011-199901 filed on Sep. 13, 2011, the disclosure of which is incorporated herein by reference.

BACKGROUND

The present technology relates to a spectrum analysis apparatus, a fine particle measurement apparatus, and a method and program for a spectrum analysis or a spectrum chart display. More particularly, the present technology relates to a spectrum analysis apparatus and the like capable of obtaining a spectrum chart accurately reflecting optical characteristics of a measurement target object.

A flow cytometer is an apparatus that optically measures characteristics of fine particles by radiating light to the fine particles such as cells, beads, or the like that flow through a flow cell and detecting fluorescence, scattered light, or the like emitted from the fine particles.

For example, when the fluorescence of cells is detected, excitation light having an appropriate wavelength and intensity such as laser light is radiated to a cell labeled by a fluorochrome. The fluorescence emitted from the fluorochrome is condensed by a lens or the like, light of an appropriate wavelength band is selected using a wavelength selection element such as a filter or a dichroic mirror, and the selected light is detected using a light-receiving element such as a photo multiplier tube (PMT). At this time, it is possible to simultaneously detect and analyze fluorescence from a plurality of fluorochromes labeled to cells by a plurality of combinations of wavelength selection elements and light-receiving elements. Further, it is also possible to increase the number of analyzable fluorochromes by combining excitation light of a plurality of wavelengths.

In the related art, analysis data of the flow cytometer is displayed by a histogram or a two-dimensional (2D) plot. Although a linear axis or a logarithmic axis is generally used as a coordinate axis representing an intensity value of light in the histogram and the 2D plot, technology using a biexponential axis having characteristics in which the linear axis and the logarithmic axis are combined is also known (see NPL 1). In the histogram and the 2D plot using the biexponential axis as the coordinate axis, a display of a wide dynamic range utilizing characteristics of the logarithmic axis is possible and simultaneously a display of a negative number according to characteristics of the linear axis is also possible.

In the fluorescence detection by the flow cytometer, there is a method of measuring an intensity of light in a continuous wavelength band as a fluorescence spectrum in addition to a method of selecting a plurality of pieces of light of a discontinuous wavelength band using a wavelength selection element such as a filter and measuring an intensity of light of each wavelength band. In a spectral flow cytometer in which a fluorescence spectrum is measurable, the fluorescence emitted from the fine particles is spectrally separated using a spectral element such as a prism or a grating. The spectrally separated fluorescence is detected using a light-receiving element array in which a plurality of light-receiving elements having different detection wavelength bands are arranged. As the light-receiving element array, a PMT array or a photodiode array in which light-receiving elements such as PMTs or photodiodes are arranged in one dimension or an array of a plurality of independent detection channels of 2D light-receiving elements such as charge-coupled devices (CCDs) or complementary metal-oxide-semiconductors (CMOSs) is used.

CITATION LIST

Patent Literature

[PTL 1]
JP 2003-83894A

Non Patent Literature

[NPL 1]
A New "Logicle" Display Method Avoids Deceptive Effects of Logarithmic Scaling for Low Signals and Compensated Data. Cytometry Part A 69A:541-551, 2006.

SUMMARY

Technical Problem

The analysis data in the spectral flow cytometer can be displayed by a spectrum chart in addition to the histogram and the 2D plot. In the spectrum chart, a channel or a detection wavelength of the light-receiving element is represented on the horizontal axis, an intensity value of light is represented on the vertical axis, and information (population information) regarding the number of fine particles (an event count or density) is represented by the gradation of color, a color tone, or the like. According to the spectrum chart, it is possible to intuitively recognize a fluorescence spectrum and population information of fine particles.

In the spectrum chart, the linear axis or the logarithmic axis is used as a coordinate axis representing an intensity value of light in the related art. However, the chart using the logarithmic axis has a limitation in that a spectrum of fine particles having a low intensity value is rendered with unreasonably high dispersion, and a negative number is not displayed. On the other hand, there is a problem in that it is difficult to discriminate a spectral shape of fine particles having a low intensity value even in the chart using the linear axis. Further, in the spectrum chart of the related art, there is no method suitable for displaying a spectrum by subtracting a spectrum component derived from an intensity value (background value) detected in a control sample such as an unlabeled cell.

It is desirable to provide technology for displaying a wide dynamic range and a negative number and obtaining a spectrum chart appropriately reflecting an intensity of light generated from fine particles.

Solution to Problem

In accordance with an embodiment of the present technology, there is provided a spectrum analysis apparatus including: a processing unit configured to generate analysis data using an analysis function in which a linear function and a logarithmic function are included as function elements and an intensity value is set as a variable from measurement data including the intensity value of light acquired by detecting the light from a measurement target object using a plurality of light-receiving elements having different detection wavelength bands.

The spectrum analysis apparatus includes a display unit configured to display the analysis data in a spectrum chart in which one axis represents a value corresponding to the detection wavelength band and the other axis represents an output value of the analysis function.

According to this spectrum chart, a wide dynamic range including a negative value can be displayed, and a spectrum that appropriately expresses optical characteristics of a measurement target object can be displayed by suppressing dispersion.

In this spectrum analysis apparatus, the processing unit is configured to generate the analysis data by applying a function in which the linear function is set as a main function element for data in which the intensity value is small among the measurement data and the logarithmic function is set as the main function element for data in which the intensity value is large among the measurement data as the analysis function.

Specifically, the processing unit can generate the analysis data by applying a function in which the linear function is set as a main function element for data in which the intensity value is less than a predetermined value among the measurement data and the logarithmic function is set as the main function element for data in which the intensity value is greater than the predetermined value among the measurement data as the analysis function. In this case, the display unit displays the spectrum chart in which the axis of the output value is set as the logarithmic axis in a region in which the output value is greater than the predetermined value and set as the linear axis in a region in which the output value is less than the predetermined value.

In the spectrum analysis apparatus, it is preferable that the processing unit be configured to generate analysis data corrected using the analysis function in which the linear function and the logarithmic function are included as the function elements and the intensity value is set as the variable, after subtracting measurement data including an intensity value obtained by detecting light from a control sample using a plurality of light-receiving elements having different detection wavelength bands from measurement data including an intensity value obtained by detecting light from a measurement sample using a plurality of light-receiving elements having different detection wavelength bands, and the display unit be configured to display the corrected analysis data in the spectrum chart.

In addition, in the spectrum analysis apparatus, the measurement data can include the intensity value of light detected and obtained by a light-receiving element array in which a plurality of light-receiving elements having different detection wavelength bands are arranged to spectrally separate the light from a measurement target object. In this case, it is preferable for the processing unit to correct the intensity value in a detection wavelength band width of each light-receiving element and generate the analysis data.

In the spectrum analysis apparatus in accordance with the present technology, particularly, the measurement target object can be fine particles, and the optical characteristics of the fine particles can be displayed in the spectrum chart. In this case, it is preferable for the display unit to perform a multicolor display of the spectrum chart. The multicolor display can be performed by displaying the spectrum chart according to a hue, saturation, and/or brightness reflecting frequency information of the fine particles.

In addition, the spectrum analysis apparatus in accordance with the present technology can be configured as a spectral flow cytometer, particularly, even in the fine particle measurement apparatus.

In accordance with other embodiments of the present technology, there are provided a spectrum analysis method including: a procedure of generating analysis data using an analysis function in which a linear function and a logarithmic function are included as function elements and an intensity value is set as a variable from measurement data including the intensity value of light acquired by detecting the light from a measurement target object using a plurality of light-receiving elements having different detection wavelength bands, and a spectrum-chart displaying method including a procedure of displaying a spectrum chart in which one axis represents a value corresponding to the detection wavelength band and the other axis represents an output value of the analysis function.

In accordance with still other embodiments of the present technology, there are provided a spectrum analysis program for executing: generating analysis data using an analysis function in which a linear function and a logarithmic function are included as function elements and an intensity value is set as a variable from measurement data including the intensity value of light acquired by detecting the light from a measurement target object using a plurality of light-receiving elements having different detection wavelength bands, and a spectrum-chart displaying program for executing: displaying the analysis data in a spectrum chart in which one axis represents a value corresponding to the detection wavelength band and the other axis represents an output value of the analysis function.

In the present technology, the "fine particles" include biologically-relevant fine particles such as cells, microorganisms, and liposomes or synthetic particles such as latex particles, gel particles, and industrial particles.

The biologically-relevant fine particles include chromosomes, liposomes, mitochondria, and organelles constituting various cells. The cells include animal cells (such as blood cells) and plant cells. The microorganisms include bacteria such as *Escherichia coli*, viruses such as tobacco mosaic viruses, and fungi such as yeast. Further, the biologically-relevant fine particles can also include biologically-relevant macromolecules such as nucleic acids, proteins, and complexes thereof. In addition, the industrial particles, for example, may be organic or inorganic polymeric materials, or metals. The organic polymeric materials include polystyrene, styrene-divinylbenzene, polymethyl methacrylate, and the like. The inorganic polymeric materials include glass, silica, magnetic materials, and the like. The metals include colloidal gold, aluminum, and the like. In general, shapes of these fine particles are commonly spherical, but may be non-spherical. In addition, a size, mass, and the like are not particularly limited.

Advantageous Effects of Invention

In accordance with the present technology, technology for displaying a wide dynamic range and a negative number and obtaining a spectrum chart appropriately reflecting an intensity of light generated from fine particles is provided.

Additional features and advantages are described herein, and will be apparent from the following Detailed Description and the figures.

BRIEF DESCRIPTION OF THE FIGURES

FIG. 1 is a block diagram illustrating a functional configuration of a spectrum analysis apparatus A in accordance with the present technology.

FIG. 2 is a schematic diagram illustrating a configuration of a measurement unit 10 of the spectrum analysis apparatus A.

FIG. 3 is a graph as a substitute for a drawing illustrating an analysis function.

FIG. 4 is a graph as a substitute for a drawing illustrating a spectrum chart in which the horizontal axis represents a PMT channel number and the vertical axis represents an output value of an analysis function.

FIG. 5 is a graph as a substitute for a drawing illustrating a spectrum chart obtained by measuring a mixed sample in Example 1.

FIG. 6 is a graph as a substitute for a drawing illustrating a spectrum chart reflecting frequency information of beads in the spectrum chart illustrated in FIG. 5 according to a color tone.

FIG. 7 is a graph as a substitute for a drawing illustrating a spectrum chart obtained by measuring a mixed sample and blank beads in Example 1 and a spectrum chart of a mixed sample after correction of a background value.

FIG. 8 is a graph as a substitute for a drawing illustrating a result obtained by determining a detection wavelength band of each PMT of a PMT array in Example 2.

FIG. 9 is a graph as a substitute for a drawing illustrating a result obtained by calculating the relative sensitivity of each PMT of a PMT array in Example 2.

FIG. 10 is a graph as a substitute for a drawing illustrating a spectrum chart of fluorescent beads obtained by measurement using a fluorescence spectrophotometer in Example 2.

FIG. 11 is a graph as a substitute for a drawing illustrating a spectrum chart of fluorescent beads, fluorescent particle kit (FPK) 505, obtained by measurement using a flow cytometer in Example 2 in which a graph (A) illustrates a chart before a correction process, a graph (B) illustrates a chart by a first correction intensity value, and a graph (C) illustrates a chart by a second correction intensity value.

FIG. 12 is a graph as a substitute for a drawing illustrating a spectrum chart of fluorescent beads, FPK 505, obtained by measurement using a flow cytometer in Example 2 in which a graph (A) illustrates a chart before a correction process, a graph (B) illustrates a chart by a first correction intensity value, and a graph (C) illustrates a chart by a second correction intensity value.

FIG. 13 is a graph as a substitute for a drawing illustrating a spectrum chart of fluorescent beads, FPK 528, obtained by measurement using a flow cytometer in Example 2 in which a graph (A) illustrates a chart before a correction process, a graph (B) illustrates a chart by a first correction intensity value, and a graph (C) illustrates a chart by a second correction intensity value.

FIG. 14 is a graph as a substitute for a drawing illustrating a spectrum chart of fluorescent beads, FPK 549, obtained by measurement using a flow cytometer in Example 2 in which a graph (A) illustrates a chart before a correction process, a graph (B) illustrates a chart by a first correction intensity value, and a graph (C) illustrates a chart by a second correction intensity value.

FIG. 15 is a graph as a substitute for a drawing illustrating a spectrum chart of fluorescent beads, FPK 667, obtained by measurement using a flow cytometer in Example 2 in which a graph (A) illustrates a chart before a correction process, a graph (B) illustrates a chart by a first correction intensity value, and a graph (C) illustrates a chart by a second correction intensity value.

FIG. 16 is a graph as a substitute for a drawing illustrating a chart in which correction is performed according to a detection wavelength band width of a light-receiving element and the horizontal axis represents a detection wavelength in a spectrum chart obtained by measuring a mixed sample in Example 1.

DETAILED DESCRIPTION

Hereinafter, preferred embodiments of the present technology will be described with reference to the appended drawings. The embodiments described hereinafter are representative embodiments of the present technology. Thereby, the scope of the present technology is not narrowly interpreted. Description will be given in the following order.

1. Configuration of Spectrum Analysis Apparatus
2. Generation of Analysis Data
(1) Analysis Function
(2) Background Correction
(3) Correction according to Detection Wavelength Band Width and Relative Sensitivity of Light-Receiving Element
   <Calculation of First Correction Intensity Value>
   <Calculation of Second Correction Intensity Value>
3. Data Display
4. Program for Spectrum Analysis and Spectrum Chart Display 1. Configuration of Spectrum Analysis Apparatus FIG. 1 is a block diagram illustrating a functional configuration of a spectrum analysis apparatus A in accordance with the present technology. In addition, FIG. 2 is a schematic diagram illustrating a configuration of a measurement unit 10 of the spectrum analysis apparatus A. Hereinafter, an example in which the spectrum analysis apparatus A is configured as a spectral flow cytometer will be described.

The spectrum analysis apparatus A includes a measurement unit 10 that detects fluorescence emitted from fine particles by radiating laser light to the fine particles, converts an intensity of the detected fluorescence into an electrical signal, and outputs the electrical signal as measurement data, a central processing unit (CPU) 20, a memory 30, and a hard disk (storage unit) 40. In the spectrum analysis apparatus A, the CPU 20, the memory 30, and the hard disk (storage unit) 40 constitute a processing unit. In addition, the spectrum analysis apparatus A includes a mouse 51, a keyboard 52, and a display unit 60 configured to include a display 61 and a printer 62 as user interfaces.

The measurement unit 10 can have the same configuration as a fine particle measurement apparatus of the related art. Specifically, the measurement unit 10 includes an irradiation system that condenses/radiates laser light from a light source 101 to fine particles P and a detection system including a spectral element 102 that spectrally separates fluorescence emitted from the fine particles P and a light-receiving element array 103 that detects the spectrally separated light. In the spectrum analysis apparatus A, the fine particles P are arranged in one row inside a flow path formed within a flow cell or on a microchip and flow through the flow path.

The irradiation system includes a condensing lens for condensing/radiating laser light to the fine particles P, a dichroic mirror, a band pass filter, and the like (not illustrated) in addition to the light source 101. The light source 101 may be a combination of two or more light sources that emit light having different wavelengths. In this case, positions in which two or more pieces of laser light are irradiated to the fine particles P may be the same or different. In addition, the detection system may include a condensing lens or the like (not illustrated) for condensing fluorescence generated from the fine particles P and performing light guiding to the spectral element 102. Here, an example of a configuration using a PMT array in which PMTs of 32 channels having different detection wavelength bands are arranged in one dimension is illustrated as the light-receiving element array 103. An array of a plurality of independent detection channels having different detection wavelength bands such as photodiodes or 2D light-receiving elements such as CCDs, or CMOSs can also be used in the light-receiving element array 103.

In the spectrum analysis apparatus A, the measurement unit 10 may be also configured to detect light generated from the fine particles P according to the radiation of laser light, for example, forward scattered light, lateral scattered light, and scattered light of Rayleigh scattering, Mie scattering, or the like, in addition to the fluorescence.

2. Generation of Analysis Data (1) Analysis Function

The CPU 20 and the memory 30 operate in cooperation with an operating system (OS) 42 and a program 41 for a spectrum analysis and a spectrum chart display stored in the hard disk 40, and generates analysis data using an analysis function from measurement data including an intensity value of fluorescence output from the measurement unit 10. The analysis data is generated using the analysis function in which a linear function and a logarithmic function are included as function elements and the intensity value is set as a variable from the measurement data.

Here, an n-th intensity value obtained by a PMT of channel k among PMTs of channels 1 to 32 is defined as I[k,n]. In addition, the analysis function is defined as $F(x)$ (where x is a variable). In this case, an output value of the analysis data is obtained by $F(I[k,n])$.

In FIG. 3, the analysis function $F(x)$ is illustrated. In the analysis function $F(x)$, the linear function is set as a main function element for data in which the intensity value I is small, and the logarithmic function is set as the main function element for data in which the intensity value I is large. In other words, in the analysis function $F(x)$, an element of the linear function is more strongly applied to the data in which the intensity value I is small, and an element of the logarithmic function is more strongly applied to the data in which the intensity value I is large.

It is possible to apply a well-known function of the related art such as a function based on a biexponential technique or a Logicle function to the analysis function $F(x)$ (see NPL1). More conveniently, a function in which the linear function is set as a function element for a measurement data region RL in which the intensity value I is less than a predetermined value Ia, and the logarithmic function is set as a function element for a measurement data region RH in which the intensity value I is greater than the predetermined value Ia can be used as the analysis function $F(x)$. More conveniently, as the analysis function $F(x)$, the linear function can applied to a measurement data region RL in which the intensity value I is less than the predetermined value Ia, and the logarithmic function can be applied to a measurement data region RH in which the intensity value I is greater than the predetermined value Ia.

In this case, it is only necessary to apply one of the linear function and the logarithmic function as a function element for the intensity value Ia serving as a boundary value. In addition, it is desirable that the analysis function $F(x)$ be continuous in a boundary between the measurement data region RL and the measurement data region RH, and slopes of the analysis function $F(x)$ in the measurement data region RL and the measurement data region RH be consistent in the boundary value Ia.

According to conversion of measurement data by the analysis function $F(x)$, a wide dynamic range utilizing characteristics of the logarithmic function can be provided and simultaneously analysis data including a negative value can also be obtained according to characteristics of the linear axis. The boundary value Ia can be arbitrarily set as long as an advantageous effect in accordance with the present technology is exhibited, and, for example, can be set according to the method disclosed in the above-described NPL 1.

(2) Background Correction

The processing unit corrects a background value using analysis data obtained by measuring fine particles (a control sample) for negative control such as a cell (unlabeled cell), which is not labeled by a fluorochrome, when analysis data is generated. The background value is corrected by subtracting a measurement data value of the control sample from measurement data of a measurement sample.

An intensity value of an n-th control sample obtained by a PMT of channel k among the PMTs of channels 1 to 32 is defined as $I_o[k,n]$, and the intensity value of the measurement sample is defined as $I[k,n]$. In this case, the background value is corrected by subtracting the intensity value $I_o[k,n]$ of the control sample from the intensity value $I[k,n]$ of the measurement sample, that is, by calculating a value of $(I[k,n]-I_o[k,n])$.

It is preferable to generate the above-described analysis data using the analysis function $F(x)$ from the measurement data $(I[k,n]-I_o[k,n])$ after the subtraction.

(3) Correction According to Detection Wavelength Band Width and Relative Sensitivity of Light-Receiving Element In addition, the processing unit configured to include the CPU 20, the memory 30, and the hard disk 40 performs a correction process of calculating a first correction intensity value by correcting an intensity value of fluorescence according to detection wavelength width of each of light-receiving elements (here, PMTs of channels 1 to 32). Further, the processing unit performs a correction process of calculating a second correction intensity value by correcting the first correction intensity value using sensitivity data of each PMT.

<Calculation of First Correction Intensity Value>

The calculation of the first correction intensity value is carried out by dividing an intensity value of fluorescence acquired by each PMT by a detection wavelength band width of each PMT.

Specifically, an intensity value of an n-th control sample obtained by a PMT of channel k among the PMTs of channels 1 to 32 is defined as $I[k,n]$, a detection lower-limit wavelength of a PMT of channel k is set as $L[k]$ and a detection lower-limit wavelength is set as $H[k]$. In this case, the first correction intensity value $J_1[k, n]$ is calculated by the following expression. Here, k indicates an integer of 1 to 32. $J_1[k,n]=I[k,n]/(H[k]-L[k])$ When an optical system of the measurement unit 10 including the spectral element 102 has non-linearity, wavelength band widths of light detected by the PMTs of channels 1 to 32 become different between the PMTs (see FIG. 8 given later). Thus, the intensity value of fluorescence acquired by each PMT is relatively large in a channel in which a detection wavelength width is wide and relatively small in a channel in which the detection wavelength with is narrow, and distortion occurs in a spectral shape.

It is possible to compensate for the distortion of the spectral shape due to the non-linearity of the above-described optical system in the first correction intensity value obtained by dividing the intensity value of fluorescence acquired by each PMT by the detection wavelength band width of each PMT.

The detection wavelength width (H[k]−L[k]) of each PMT is uniquely determined by types or layouts of optical elements such as the spectral element 102, the condensing lens, the dichroic mirror, and the band pass filter constituting the measurement unit 10 (see FIG. 8 given later). Thus, in the step in which an apparatus design including the selection and layouts of the optical elements has been completed, it is possible to calculate the first correction intensity value from the intensity value of fluorescence acquired by each PMT by acquiring a detection wavelength width of each PMT.

<Calculation of Second Correction Intensity Value>

The calculation of the second correction intensity value is carried out by dividing the first correction intensity value in each PMT by relative sensitivity of each PMT.

Specifically, the relative sensitivity of a PMT of channel k among the PMTs of channels 1 to 32 is set as S[k]. In this case, the second correction intensity value $J_2[k,n]$ is calculated by the following expression.

$$J_2[k,n]=J_1[k,n]/S[k]$$

Here, for the relative sensitivity, an intensity value obtained in each channel by radiating light of the same intensity and the same wavelength to the PMT is indicated by a relative value to an intensity value of a channel in which the highest intensity value has been obtained. The relative sensitivity can be pre-calculated from sensitivity data recording an electrical signal amount output from each channel when light of the same intensity and the same wavelength has been radiated to the PMT. Both a sensitivity difference inherent in each PMT and a sensitivity difference (gain) set by a user to each PMT are reflected in the sensitivity data. The gain can be appropriately adjusted by changing a setting value such as an applied voltage.

The sensitivities of the PMTs of channels 1 to 32 are different between the PMTs according to an individual difference of the PMT and a gain setting difference (see FIG. 9 given later). Thus, the intensity value of fluorescence acquired by each PMT is relatively large in a channel in which the sensitivity is high and relatively small in a channel in which the sensitivity is low, and distortion occurs in a spectral shape.

It is possible to compensate for the distortion of the spectral shape due to a sensitivity difference between the above-described light-receiving elements in the second correction intensity value obtained by dividing the first correction intensity value of each PMT by the relative sensitivity of each PMT.

It is preferable to generate the above-described analysis data using the analysis function F(x) from measurement data ($J_1[k,n]$ or $J_2[k,n]$) after a correction process for the first correction intensity value or a second measurement intensity value. The correction process for the first correction intensity value or the second measurement intensity value is not limited to a method to be performed for measurement data before conversion by the analysis function F(x) as described above, and can be performed for analysis data after the conversion by the analysis function F(x).

3. Data Display

The processing unit generates a spectrum chart in which one axis represents a value corresponding to a detection wavelength band and the other axis represents an output value of an analysis function, and causes the display unit 60 to display the spectrum chart. The spectrum chart can have the horizontal axis representing a channel number or a detection wavelength of the PMT as a value corresponding to a detection wavelength band and the vertical axis representing an output value of the analysis function (see (C) of FIGS. 5 and 16 given later).

The spectrum chart in which the horizontal axis represents the channel number of the PMT and the vertical axis represents the output value of the analysis function is illustrated in FIG. 4. An n-th intensity value obtained by the PMT of channel k is set as I[k,n], and the output value is set as F(I[k,n]). The number of fine particles (an event count or density) included in an output value range that is greater than or equal to $V_i$ and less than $V_{i+1}$ is calculated, and a region corresponding to channel k and the intensity $V_i$ to $V_{i+1}$ is colored with a color tone corresponding to a value of the calculation result. It is possible to create and display the spectrum chart illustrated in the drawing by iterating this procedure for each channel and the output value range. Information (frequency information) regarding the number of fine particles is obtained by performing a multicolor display of the spectrum chart according to a hue, saturation, and/or brightness reflecting the information. The conversion of the frequency information into the hue, saturation, and/or brightness can be performed by a technique well known in the related art (see the examples).

In the spectrum chart, it is possible to display a wide dynamic range utilizing characteristics of a logarithmic function according to the conversion of measurement data by the analysis function F(x), and also express a negative output value according to characteristics of the linear axis. In addition, it is possible to solve a problem in that the spectrum is extracted with unreasonably high dispersion in a region in which the intensity value is small.

Further, when the above-described background correction for the analysis data value of the vertical axis has been performed in the spectrum chart, it is possible to display the spectrum even when measurement data (I[k,n]−$I_o$[k,n]) after subtraction becomes a negative value.

It is preferable to correct the analysis data value of the vertical axis according to the detection wavelength band width and the relative sensitivity of the above-described light-receiving element. Thereby, it is possible to display a chart in which the distortion of the spectral shape due to the non-linearity of the optical system of the apparatus and the sensitivity difference between the light-receiving elements has been compensated for. When the correction according to the detection wavelength band width or the like of the light-receiving element is performed, the horizontal axis of the spectrum chart represents the detection wavelength of the PMT (see (B)/(C) of FIGS. 11 to 15 given later).

In the spectrum chart, it is possible to display the intensity value by a mean value, a standard error, a median value, or a statistical numerical value of a quartile point or the like based on the number of fine particles (an event count or a density) detected in a predetermined fluorescence intensity value in a predetermined detection wavelength (see FIG. 12 given later). Further, the spectrum chart can also be displayed as a three-dimensional (3D) graph to which a coordinate axis representing an event count has been added. This 3D graph can be displayed according to a pseudo 3D display.

4. Program for Spectrum Analysis and Spectrum Chart Display

The spectrum analysis program and the spectrum chart display program in accordance with the present technology execute the steps of generating analysis data and displaying data in the above-described spectrum analysis apparatus.

The program (see reference numeral 41 in FIG. 1) is stored/retained in the hard disk 40, and loaded into the memory 30 under control of the CPU 20 and the OS 42. The program executes a process of generating analysis data and displaying data. The program can be recorded on a computer-readable recording medium. The recording medium is not particularly limited as long as the recording medium is a computer-readable recording medium. Specifically, for example, a flexible disk or a disk-shaped recording medium such as a compact disc read only memory (CD-ROM) is used. In addition, a tape recording medium such as a magnetic tape may be used.

Additionally, the present technology may also be configured as below.

(1) A spectrum analysis apparatus including:

a processing unit configured to generate analysis data using an analysis function in which a linear function and a logarithmic function are included as function elements and an intensity value is set as a variable from measurement data including the intensity value of light acquired by detecting the light from a measurement target object using a plurality of light-receiving elements having different detection wavelength bands.

(2) The spectrum analysis apparatus according to (1), including:

a display unit configured to display the analysis data in a spectrum chart in which one axis represents a value corresponding to the detection wavelength band and the other axis represents an output value of the analysis function.

(3) The spectrum analysis apparatus according to (2), wherein the processing unit generates the analysis data by applying, as the analysis function, a function in which the linear function is set as a main function element for data in which the intensity value is less than a predetermined value among the measurement data and a function in which the logarithmic function is set as the main function element for data in which the intensity value is greater than the predetermined value among the measurement data.

(4) The spectrum analysis apparatus according to (2) or (3), wherein the processing unit generates the analysis data by more strongly applying, as the analysis function, an element of the linear function to data in which the intensity value is less than a predetermined value among the measurement data and an element of the logarithmic function to data in which the intensity value is greater than a predetermined value among the measurement data.

(5) The spectrum analysis apparatus according to (4), wherein the display unit displays the spectrum chart in which an axis of the output value is set as a logarithmic axis in a region in which the output value is greater than a predetermined value and set as a linear axis in a region in which the output value is less than the predetermined value.

(6) The spectrum analysis apparatus according to any one of (2) to (5), wherein the processing unit generates analysis data corrected using the analysis function in which the linear function and the logarithmic function are included as the function elements and the intensity value is set as the variable, after subtracting measurement data including an intensity value obtained by detecting light from a control sample using a plurality of light-receiving elements having different detection wavelength bands from measurement data including an intensity value obtained by detecting light from a measurement sample using a plurality of light-receiving elements having different detection wavelength bands, and wherein the display unit displays the corrected analysis data in the spectrum chart.

(7) The spectrum analysis apparatus according to any one of (1) to (7), wherein the measurement data includes the intensity value of light detected and obtained by a light-receiving element array in which a plurality of light-receiving elements having different detection wavelength bands are arranged to spectrally separate the light from a measurement target object.

(8) The spectrum analysis apparatus according to any one of (1) to (7), wherein the processing unit corrects the intensity value according to a detection wavelength band width of each light-receiving element and generates the analysis data.

(9) The spectrum analysis apparatus according to any one of (1) to (8), wherein the measurement target object is fine particles, and wherein optical characteristics of the fine particles are displayed in the spectrum chart.

(10) The spectrum analysis apparatus according to any one of (1) to (9), wherein the display unit performs a multicolor display of the spectrum chart.

(11) The spectrum analysis apparatus according to (9) or (10), wherein the display unit performs the multicolor display of the spectrum chart according to a hue, saturation, and/or brightness reflecting frequency information of the fine particles.

Example 1

1. Spectrum Chart Generation and Background Correction

A prototype spectral flow cytometer equipped with the measurement unit of the configuration illustrated in FIG. 2 was made. As the light source, a laser diode with a wavelength of 488 nm and a laser diode with a wavelength of 638 nm were used. In addition, as the spectral element, a prism array in which a plurality of prisms are combined was used. As the light-receiving element array, a PMT array of 32 channels was used. Fluorescence of a wavelength 500 nm to 800 nm was spectrally detected.

Using this apparatus, mixed samples of fluorescent beads, FPK 505, FPK 528, and FPK 549, acquired from Sherotech Inc. and unlabeled negative control beads (blank beads) were measured. After an appropriate population was extracted according to gating using statistical software R (R-project.org) for the acquired data, a spectrum chart was displayed.

The results are illustrated in FIG. 5. A graph (A) illustrates a chart in which the vertical axis represents the intensity value I as the logarithmic axis, and a graph (B) illustrates a chart in which the linear axis represents the intensity value I. A graph (C) illustrates a spectrum chart in which the vertical axis is set as the logarithmic axis in a region in which the intensity value I is greater than 10,000, and set as the linear axis in a region in which the intensity value I is less than 10,000. The horizontal axis represents a channel number of the PMT. Here, bead frequency information is indicated according to the gradation of the spectrum chart.

In the logarithmic-axis chart illustrated in the graph (A), dispersion of the spectrum of (dark) beads in which a fluorescent level is low is displayed to be very large. In addition, in the linear-axis chart illustrated in the graph (B), dispersion of the spectrum of (bright) beads in which a fluorescent level is high is displayed to be very large and it is difficult to discriminate a spectral shape of dark beads. On the other hand, in the hybrid-axis chart illustrated in the graph (C), the spectrum of dark beads is not extremely wide, a sharp shape in which dispersion is low can be displayed, and spectral shapes of three types of beads for a wide dynamic range can be displayed in a state in which they are capable of being clearly discriminated.

In addition, FIG. 6 illustrates a spectrum chart reflecting bead frequency information according to a color tone in the chart illustrated in the graph (C) of FIG. 5. A graph (A) is a chart obtained by performing conversion into a hue, saturation, and/or brightness of the frequency information using a "rainbow" function of the statistical software R. A graph (B) is a chart obtained by performing conversion into a hue, saturation, and/or brightness of the frequency information using a "topo. colors" function of the statistical software R. A graph (C) is a chart obtained by performing conversion into a hue, saturation, and/or brightness of the frequency information using a "cm. colors" function of the statistical software R. A graph (D) is a chart obtained by performing conversion into a hue, saturation, and/or brightness of the frequency information using a "terrain. colors" function of the statistical software R. A graph (E) is a chart obtained by performing conversion into a hue, saturation, and/or brightness of the frequency information using a "heat. colors" function of the statistical software R. A graph (F) is a chart obtained by performing conversion into a hue, saturation, and/or brightness of the frequency information using a "grey" function of the statistical software R. In these spectrum charts, drawings of the measurement results of the PMTs of channels 20 to 32 are omitted.

FIG. 7 illustrates results obtained by performing background correction in which measurement data of blank beads is subtracted from the measurement data of a mixed sample. Graphs (A) to (C) illustrate charts in which the vertical axis represents the intensity values I and $I_o$ as the logarithmic axis, and graphs (D) to (F) illustrate spectrum charts in which the vertical axis is set as the logarithmic axis in a region in which the intensity value I or the intensity value $(I-I_o)$ after subtraction is greater than 10,000, and set as the linear axis in a region in which the intensity value I or the intensity value $(I-I_o)$ is less than 10,000. In addition, the graphs (A) and (D) illustrate spectrum charts of mixed samples, the graphs (B) and (D) illustrate spectrum charts of blank beads, and the graphs (C) and (F) illustrate spectrum charts of mixed samples after background correction.

In the chart illustrated in the graph (F), it is possible to clearly recognize a spectral shape of dark beads as compared to the chart illustrated in the graph (C).

As seen from the above-described results, according to the spectrum analysis apparatus in accordance with the present technology, a wide dynamic range including a negative number can be provided and a spectrum chart appropriately reflecting an intensity of light generated from fine particles can be displayed.

Example 2

2. Correction According to Detection Wavelength Band Width and Relative Sensitivity of Light-Receiving Element A graph determining a detection wavelength band in the prototype apparatus is illustrated in FIG. 8. In the graph, "X" denotes a detection lower-limit wavelength L[k] of the PMT of each channel, and "O" denotes a detection upper-limit wavelength H[k]. Here, k denotes an integer of 1 to 32. The detection wavelength band width (H[k]−L[k]) of each PMT is recognized to be as wide as in the PMT of a long-wavelength side. In the PMTs after and before channel 21 that detects fluorescence around a wavelength of 638 nm, the detected fluorescence is also limited by an optical filter that prevents the leakage of laser light from a light source with the wavelength of 638 nm.

In addition, a graph obtained by calculating the relative sensitivity of each PMT is illustrated in FIG. 9. The relative sensitivity is indicated by a relative value when the intensity value of channel 32 in which the highest intensity value has been obtained among the intensity values obtained by the channels by radiating light of the same intensity and the same wavelength to the PMTs is set to 1.

Initially, a fluorescence spectrum of commercially available fluorescent beads was measured using an F-4500 fluorescence spectrophotometer (Hitachi High-Technologies Corporation). As the fluorescent beads, four types of FPK 505, FPK 528, FPK 549, and FPK 667 acquired from Sherotech Inc. were used. The obtained spectrum chart (standard spectrum chart) is illustrated in FIG. 10. A graph (A) illustrates the fluorescence spectrum of FPK 505, a graph (B) illustrates the fluorescence spectrum of FPK 528, a graph (C) illustrates the fluorescence spectrum of FPK 549, and a graph (D) illustrates the fluorescence spectrum of FPK 667. The horizontal axis represents a fluorescent wavelength (500 to 800 nm), and the vertical axis represents a fluorescent intensity value (logarithmic indication). An excitation wavelength of the laser light is a wavelength of 488 nm in the graphs (A) to (C) and a wavelength of 638 nm in the graph (D).

Next, the fluorescence spectrum of fluorescent beads was measured using the prototype apparatus. The obtained spectrum chart is illustrated in FIGS. 11 to 15. FIGS. 11 and 12 illustrate charts of FPK 505, FIG. 13 illustrates a chart of FPK 528, FIG. 14 illustrates a chart of FPK 549, and FIG. 15 illustrates a chart of FPK 667. In FIG. 11, the event count in each channel is displayed in the color of a spectrum. In addition, in FIG. 12, the intensity value is displayed by a mean value (indicated by the solid line) and Mean Value±Standard Deviation (indicated by the dotted line) based on the event count.

In graphs (A) of FIGS. 11 to 15, spectrum charts in which the horizontal axis represents a channel number and the vertical axis represents a logarithm of an intensity value I[k] (where k denotes an integer of 1 to 32) of fluorescence acquired in each channel are illustrated.

The spectral shapes illustrated in the spectrum charts of the graphs (A) of FIGS. 11 to 15 are clearly different from the spectral shape of the standard spectrum chart illustrated in FIG. 10. This indicates that distortion occurs in the spectral shape due to a measurement error caused by the optical system of the apparatus and a sensitivity difference between the light-receiving elements in the fluorescence spectrum directly using the intensity value I[k] of fluorescence acquired by the PMT.

In graphs (B) of FIGS. 11 to 15, spectrum charts in which the horizontal axis represents a detection wavelength and the vertical axis represents a logarithm of the first correction intensity value $J_1[k]$ (where k denotes an integer of 1 to 32) of a fluorescence intensity value acquired in each channel are illustrated. The first correction intensity value $J_1[k]$ was obtained by dividing the intensity value I[k] of fluorescence acquired by each PMT by the detection wavelength band width (H[k]−L[k]) of each PMT illustrated in FIG. 8. More specifically, the spectrum chart was created by dividing an n-th intensity value I[k,n] acquired by the PMT of channel k by the detection wavelength band width (H[k]−L[k]) of the PMT to obtain the first correction value $J_1[k]$ and drawing a distribution of $J_1[k,n]$ in a range of L[k] to H[k] of the horizontal axis.

Spectral shapes illustrated in the spectrum charts of the graphs (B) of FIGS. 11 to 15 are substantially consistent with the spectral shape of the standard spectrum chart illustrated in FIG. 10. This indicates that the distortion of the spectral shape can be corrected by compensating for the measurement error due to the non-linearity of the optical system of the apparatus according to a correction process of dividing the intensity value I[k] of fluorescence acquired by each PMT by the detection wavelength band width (H[k]–L[k]) of each PMT.

In graphs (C) of FIGS. 11 to 15, spectrum charts in which the horizontal axis represents a detection wavelength and the vertical axis represents a logarithm of the second correction intensity value $J_2[k]$ (where k denotes an integer of 1 to 32) of a fluorescence intensity value acquired in each channel are illustrated. The second correction intensity value $J_2[k]$ was obtained by dividing the first correction intensity value $J_1[k]$ by the relative sensitivity S[k] of each PMT illustrated in FIG. 9.

Spectral shapes illustrated in the spectrum charts of the graphs (C) of FIGS. 11 to 15 are consistent with the spectral shape of the standard spectrum chart illustrated in FIG. 10. In particular, although the distortion of the spectral shape assumed to be caused by a sensitivity difference of the PMT in a region of around a wavelength of 500 nm is viewed in the spectrum chart based on the first correction intensity value $J_1[k]$ of (B) of FIGS. 11 to 15, the distortion is corrected in the spectrum charts based on the second correction intensity value $J_2[k]$ of the graphs (C) of FIGS. 11 to 15. This indicates that the distortion of the spectral shape can be corrected by compensating for the measurement error due to the sensitivity difference between the light-receiving elements according to a correction process of dividing the first correction intensity value $J_1[k]$ by the relative sensitivity S[k] of each PMT.

FIG. 16 illustrates the spectrum chart in which the data obtained in Example 1 is corrected according to a detection wavelength band width and the horizontal axis represents a detection wavelength. In the hybrid-axis chart illustrated in a graph (C), the spectrum of dark beads is not extremely wide, a sharp shape in which dispersion is low can be displayed, and spectral shapes of three types of beads for a wide dynamic range can be displayed in a state in which they are capable of being clearly discriminated.

It should be understood by those skilled in the art that various modifications, combinations, sub-combinations and alterations may occur depending on design requirements and other factors insofar as they are within the scope of the appended claims or the equivalents thereof.

INDUSTRIAL APPLICABILITY

In the spectrum analysis apparatus in accordance with the present technology, it is possible to display a wide dynamic range and a negative number and obtain a spectrum chart appropriately reflecting optical characteristics of a measurement target object. The spectrum analysis apparatus in accordance with the present technology can be appropriately applied to a fine particle measurement apparatus for analyzing optical characteristics of fine particles of a cell and the like in further detail, particularly, a spectral flow cytometer.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

A Spectrum analysis apparatus
P Fine particles
10 Measurement unit
101 Light source
102 Spectral element
103 Light-receiving element array
20 CPU
30 Memory
40 Hard disk (storage unit)
41 Fluorescence intensity correction program
420S
51 Mouse
52 Keyboard
60 Display unit
61 Display
62 Printer

The invention claimed is:

1. A flow cytometer comprising:
   a display unit; and
   a processor configured to (i) generate analysis data using an analysis function in which a linear function and a logarithmic function are included as function elements and an intensity value is set as a variable from measurement data including the intensity value of light acquired by detecting the light from cells using a plurality of light-receiving elements having different detection wavelength bands, (ii) use the linear function of the analysis function to assess an optical characteristic of the cells having the intensity value below a set value, and (iii) use the logarithmic function of the analysis function to assess the optical characteristic of the cells having the intensity value above the set value,
   wherein the processor is configured to correct a background value using the analysis data, including at least analysis data obtained by measuring unlabeled fine particles as a control sample, and subtracting a measurement data value of the control sample from measurement data of a measurement sample to obtain at least one negative value, and
   wherein the processor is configured to cause the display unit to display, after background correction using the background value, the analysis data including the at least one negative value in a spectrum chart including different colors reflecting the number of cells in an output value range, and in the spectrum chart, one axis represents a value corresponding to the detection wavelength band and the other axis is a hybrid axis that represents an output value of the analysis function, the hybrid axis including a linear axis and a logarithmic axis, wherein the display of the analysis data includes the at least one negative value within the linear axis.

2. The flow cytometer according to claim 1, wherein the set value is a predetermined value, and wherein the processor generates the analysis data by applying, as the analysis function, a function in which the linear function is set as a main function element for data in which the intensity value is less than the predetermined value among the measurement data and a function in which the logarithmic function is set as the main function element for data in which the intensity value is greater than the predetermined value among the measurement data.

3. The flow cytometer according to claim 1, wherein the set value is a predetermined value, and wherein the processor generates the analysis data by more strongly applying, as the analysis function, an element of the linear function to data in which the intensity value is less than the predetermined value among the measurement data and an element of the logarithmic function to data in which the intensity value is greater than the predetermined value among the measurement data.

4. The flow cytometer according to claim 3, wherein the display unit displays the spectrum chart in which the logarithmic axis is set in a region in which the output value is greater than the predetermined value and the linear axis is set in a region in which the output value is less than the predetermined value.

5. The flow cytometer according to claim 4,
wherein the processor generates analysis data corrected using the analysis function in which the linear function and the logarithmic function are included as the function elements and the intensity value is set as the variable, after subtracting measurement data including an intensity value obtained by detecting light from a control sample using a plurality of light-receiving elements having different detection wavelength bands from measurement data including an intensity value obtained by detecting light from a measurement sample using a plurality of light-receiving elements having different detection wavelength bands, and
wherein the display unit displays the corrected analysis data in the spectrum chart.

6. The flow cytometer according to claim 5, wherein the measurement data includes the intensity value of light detected and obtained by a light-receiving element array in which a plurality of light-receiving elements having different detection wavelength bands are arranged to spectrally separate the light from the cells.

7. The flow cytometer according to claim 6, wherein the processor corrects the intensity value according to a detection wavelength band width of each light-receiving element and generates the analysis data.

8. The flow cytometer according to claim 7,
wherein optical characteristics of the cells are displayed in the spectrum chart.

9. The flow cytometer according to claim 5, wherein cells include at least one of: (i) unlabeled particles; and (ii) labeled particles.

10. The flow cytometer according to claim 9, wherein the control sample includes the unlabeled particles, and wherein the processor is configured to correct the analysis data using an intensity value obtained by detecting light from the unlabeled particles.

11. The flow cytometer according to claim 1, wherein the display unit performs multicolor display of the spectrum chart according to a hue, saturation, and/or brightness reflecting the number of the cells.

12. A cell measurement apparatus comprising:
the spectrum analysis apparatus according to claim 11.

13. The cell measurement apparatus according to claim 12, wherein the cell measurement apparatus is a spectral flow cytometer.

14. The flow cytometer according to claim 1, wherein the processor is configured use the linear function of the analysis function to assess an optical characteristic of the cells having negative intensity values.

15. The flow cytometer according to claim 1, wherein the processor is configured to cause display of the analysis data such that a first color tone corresponds to a first number range of cells and a second color tone corresponds to a second number range of cells.

16. The flow cytometer according to claim 1, wherein the processor is configured to cause display of the analysis data in the spectrum chart such that different wavelength ranges have different colors and different intensity ranges have different colors.

17. The flow cytometer of claim 1, further comprising a light source.

18. The flow cytometer of claim 1, wherein the flow cytometer includes the plurality of light-receiving elements.

19. The flow cytometer of claim 1, further comprising a spectral element.

20. The flow cytometer of claim 19, wherein the spectral element includes a prism array.

21. The flow cytometer according to claim 1, wherein the output value range has a specific intensity range in a specific detection channel.

22. A spectrum analysis method comprising:
generating analysis data using an analysis function in which a linear function and a logarithmic function are included as function elements and an intensity value is set as a variable from measurement data including the intensity value of light acquired by detecting the light from cells using a plurality of light-receiving elements having different detection wavelength bands;
correcting a background value using the analysis data, including at least analysis data obtained by measuring unlabeled fine particles as a control sample, and subtracting a measurement data value of the control sample from measurement data of a measurement sample to obtain at least one negative value;
using the linear function of the analysis function to assess an optical characteristic of the cells having the intensity value below a set value;
using the logarithmic function of the analysis function to assess the optical characteristic of the cells having the intensity value above the set value; and
causing display, after background correction using the background value, of the analysis data including the at least one negative value in a spectrum chart including different colors reflecting the number of cells in an output value range, and in the spectrum chart, one axis represents a value corresponding to the detection wavelength band and the other axis is a hybrid axis that represents an output value of the analysis function, the hybrid axis including a linear axis and a logarithmic axis, wherein the display of the analysis data includes the at least one negative value within the linear axis.

23. The spectrum analysis method according to claim 22, which includes causing display of the analysis data such that a first color tone corresponds to a first number range of cells and a second color tone corresponds to a second number range of cells.

24. The spectrum analysis method according to claim 22, wherein the output value range has a specific intensity range in a specific detection channel.

25. A spectrum-chart displaying method, comprising:
displaying analysis data generated using an analysis function in which a linear function and a logarithmic function are included as function elements and an intensity value is set as a variable from measurement data including the intensity value of light acquired by detecting the light from cells using a plurality of light-receiving elements having different detection wavelength bands in a spectrum chart in which one axis represents a value corresponding to the detection wavelength band and the other axis represents an output value of the analysis function, the hybrid axis including a linear axis and a logarithmic axis;

correcting a background value using the analysis data, including at least analysis data obtained by measuring unlabeled fine particles as a control sample, and subtracting a measurement data value of the control sample from measurement data of a measurement sample to obtain at least one negative value, wherein the analysis data including the at least one negative value is displayed after background correction using the background value;

using the linear function of the analysis function to assess an optical characteristic of the cells having the intensity value below a set value;

using the logarithmic function of the analysis function to assess the optical characteristic of the cells having the intensity value above the set value; and using different colors in the display of the analysis data to reflect the number of cells in an output value range, wherein the display of the analysis data includes the at least one negative value within the linear axis.

26. The spectrum-chart displaying method according to claim 25, which includes using different colors in the display of the analysis data such that a first color tone corresponds to a first number range of cells and a second color tone corresponds to a second number range of cells.

27. The spectrum-chart displaying method according to claim 25, wherein the output value range has a specific intensity range in a specific detection channel.

28. A non-transitory computer-readable medium including a spectrum analysis program comprising instructions which, when executed by a processor, cause the processor to:

generate analysis data using an analysis function in which a linear function and a logarithmic function are included as function elements and an intensity value is set as a variable from measurement data including the intensity value of light acquired by detecting the light from cells using a plurality of light-receiving elements having different detection wavelength bands;

correct a background value using the analysis data, including at least analysis data obtained by measuring unlabeled fine particles as a control sample, and subtracting a measurement data value of the control sample from measurement data of a measurement sample to obtain at least one negative value;

use the linear function of the analysis function to assess an optical characteristic of the cells having the intensity value below a set value;

use the logarithmic function of the analysis function to assess the optical characteristic of the cells having the intensity value above the set value; and cause display of the analysis data including the at least one negative value, after background correction using the background value, in a spectrum chart including different colors reflecting the number of cells in an output value range, and in the spectrum chart, one axis represents a value corresponding to the detection wavelength band and the other axis is a hybrid axis that represents an output value of the analysis function, the hybrid axis including a linear axis and a logarithmic axis, wherein the display of the analysis data includes the at least one negative value within the linear axis.

29. The non-transitory computer-readable medium according to claim 28, wherein the instructions, when executed by the processor, cause the processor to cause display of the analysis data such that a first color tone corresponds to a first number range of cells and a second color tone corresponds to a second number range of cells.

30. The non-transitory computer-readable medium according to claim 28, wherein the output value range has a specific intensity range in a specific detection channel.

31. A non-transitory computer-readable medium including a spectrum-chart displaying program comprising instructions which, when executed by a processor, cause the processor to:

display analysis data generated using an analysis function in which a linear function and a logarithmic function are included as function elements and an intensity value is set as a variable from measurement data including the intensity value of light acquired by detecting the light from cells using a plurality of light-receiving elements having different detection wavelength bands in a spectrum chart in which one axis represents a value corresponding to the detection wavelength band and the other axis represents an output value of the analysis function, the hybrid axis including a linear axis and a logarithmic axis;

correct a background value using the analysis data, including at least analysis data obtained by measuring unlabeled fine particles as a control sample, and subtracting a measurement data value of the control sample from measurement data of a measurement sample to obtain at least one negative value, wherein the analysis data including the at least one negative value is displayed after background correction using the background value;

use the linear function of the analysis function to assess an optical characteristic of the cells having the intensity value below a set value;

use the logarithmic function of the analysis function to assess the optical characteristic of the cells having the intensity value above the set value; and use different colors in the display of the analysis data to reflect the number of cells in an output value range, wherein the display of the analysis data includes the at least one negative value within the linear axis.

32. The non-transitory computer-readable medium according to claim 31, wherein the instructions, when executed by the processor, cause the processor to use different colors in the display of the analysis data such that a first color tone corresponds to a first number range of cells and a second color tone corresponds to a second number range of cells.

33. The non-transitory computer-readable medium according to claim 31, wherein the output value range has a specific intensity range in a specific detection channel.

* * * * *